Patented Oct. 19, 1954

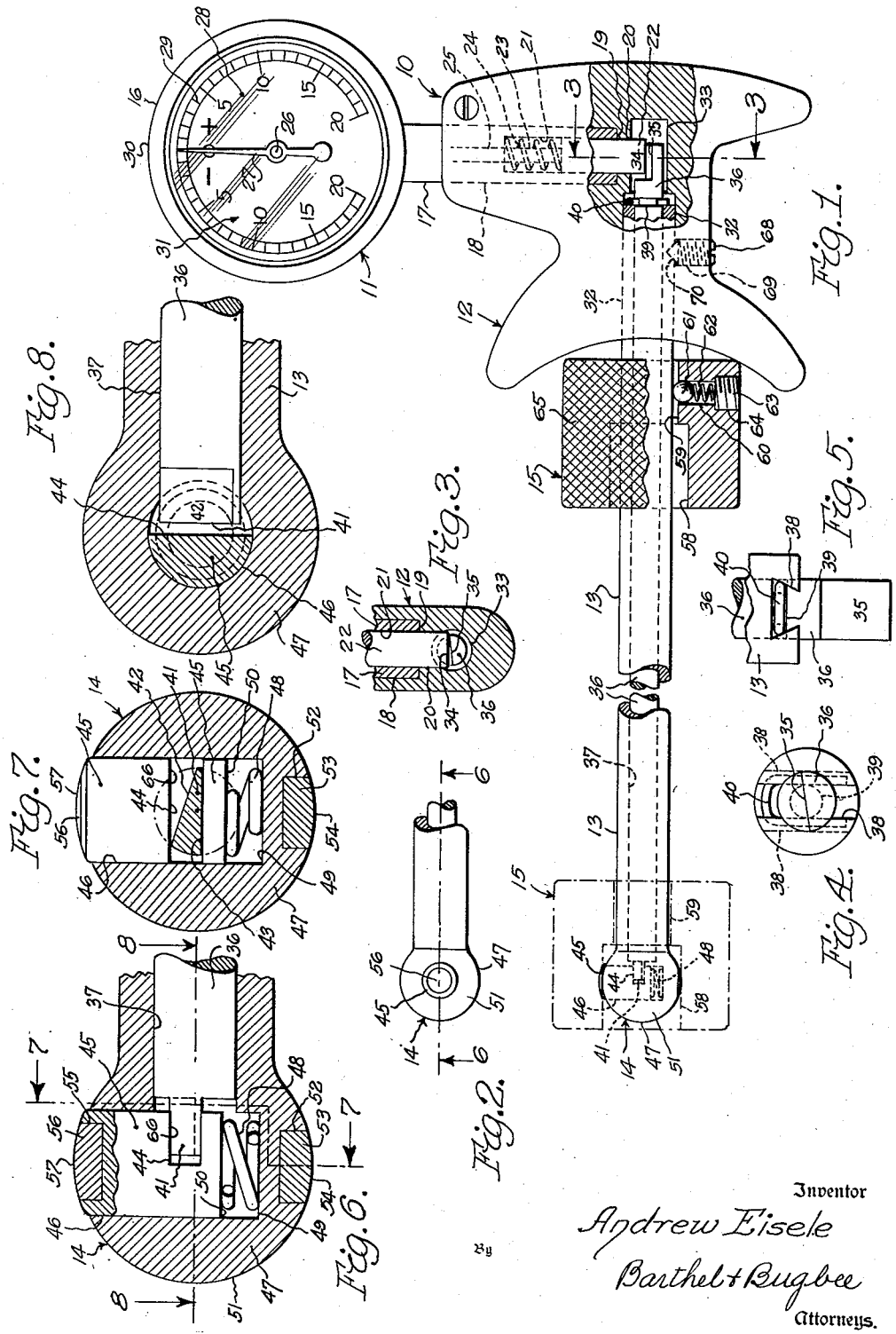
Oct. 19, 1954 — A. EISELE — 2,691,828
DIAL INDICATOR BORE GAUGE
Filed Feb. 27, 1951
Inventor
Andrew Eisele
Barthel + Bugbee
Attorneys.

2,691,828

UNITED STATES PATENT OFFICE 2,691,828

DIAL INDICATOR BORE GAUGE

Andrew Eisele, Detroit, Mich.

Application February 27, 1951, Serial No. 212,956

7 Claims. (Cl. 33—178)

This invention relates to bore gauges.

One object of this invention is to provide a bore gauge which can be quickly and easily inserted in a bore to be measured and which will instantly indicate the diameter of the bore or the variation thereof from the desired or standard diameter.

Another object is to provide a bore gauge of the foregoing character which indicates the diameter of the bore without requiring rocking or tilting of the instrument to and fro in order to obtain the measurement.

Another object is to provide a bore gauge of the foregoing character wherein the bore gauge may be tilted the full width of its contact pin or measuring pin without causing any error.

Another object is to provide a bore gauge wherein the stem of the instrument is provided with a permanently mounted checking ring which is movable into and out of engagement with the head of the instrument in order to periodically check the accuracy of reading of the instrument and adjust its scale to a true zero reading position.

Another object is to provide a bore gauge of the foregoing character which is suitable for high production work which calls for repeated measurements of bores of substantially the same diameter.

In the drawings:

Figure 1 is a side elevation of a bore gauge according to one form of the invention, with the checking ring and the motion-transmitting mechanism partly broken away to disclose its construction more clearly, and with the checking ring retracted from its checking position;

Figure 2 is a fragmentary top plan view of the outer or left-hand end of the bore gauge shown in Figure 1;

Figure 3 is a fragmentary vertical section through the motion-transmitting mechanism taken along the line 3—3 in Figure 1;

Figure 4 is a rear elevation of the stem of the instrument shown in Figure 1, showing its connection to the motion-transmitting rod;

Figure 5 is a fragmentary top plan view of the mechanism shown in Figure 4;

Figure 6 is a central vertical section through the outer end and head of the bore gauge taken along the line 6—6 in Figure 2;

Figure 7 is a cross-section through the measuring head of the bore gauge, taken along the zigzag line 7—7 in Figure 6; and Figure 8 is a horizontal section through the measuring head of the bore gauge taken along the line 8—8 in Figure 6.

Hitherto, in the use of ordinary bore gauges equipped with measuring pins for measuring the diameters of bores, it has been necessary to rock the instrument to and fro before recording the measurement in order to avoid errors in the reading of the instrument. In high production work, where measurements are made successively of bores intended to be of the same diameter, such as, for example, the measurement of bores in automobile engine cylinder blocks on a production line, such rocking of ordinary bore gauges consumes valuable time which the inspector might profitably use for other measurements. The present invention provides a bore gauge in which this rocking is substantially eliminated and in which the usual fixed measuring pins and equalizing pins are dispensed with. Moreover, the instrument carries its own checking standard in the form of a checking ring having a bore therein of the intended diameter of the production bores and movable into and out of engagement with the measuring head in order that the scale of the instrument, which is rotatably mounted, can be accurately set with its zero coinciding with the indicating needle of the dial indicator.

Referring to the drawings in detail, Figure 1 shows a bore gauge, generally designated 10, according to one form of the invention as including generally a dial indicator 11 mounted in a handle 12 which also holds the rearward end of a stem 13 carrying a measuring head unit 14, a checking ring 15 being movably mounted on the stem 13 so as to be brought into and out of checking engagement with the measuring head 14 for periodically checking its zero setting.

The dial indicator 11 is of a conventional construction and its details lie outside the scope of the present invention. For the purposes of the present description, it is sufficient to state that the dial indicator 11 has a casing 16 mounted on a tubular stem 17 which is inserted in a bore 18 in the handle 12 and which abuts an annular shoulder 19 between the bore 18 and a smaller coaxial bore 20. The inner end portion of the stem 17 is provided with a bore 21 in which is reciprocably mounted an enlarged pin 22 carried on the lower end of a rod 23 and urged through the bore 20 by a coil spring 24. The rod 23 passes upward through a smaller bore 25 which is coaxial with the bore 21 and transmits motion to the dial indicator mechanism (not shown) within the casing 16 to a rotary shaft 26 upon which is mounted an indicating needle 27. A dial 28 carrying an arcuate measuring scale 29 is rotatably mounted upon the casing 16 so that it can be rotated by the user to readjust its zero point relatively to the needle 27. The dial 28 is rotated by means of a knurled bezel 30 in which the crystal 31 of the dial indicator 11 is mounted. Thus, any motion of the pin 22 is transmitted to the needle shaft 26 and needle 27 so as to be indicated on the movable scale 29.

The handle 12 is of a shape convenient to be gripped in the palm of the hand and contains a pair of coaxial bores 32 and 33 of different diameters, the bore 33 forming a chamber into which the end portion of the pin 22 projects. The end 34 of the pin 22 engages a flattened portion 35 on the inner end of a motion-transmitting rod or shaft 36, the flattened portion 35 (Figure 3) being located substantially on a diametral plane of the motion-transmitting rod 36. The motion-transmitting rod 36 is rotatably mounted in a bore 37 in the tubular stem 13. In order to secure these members to one another, the inner end of the tubular stem 13 is provided with a dovetail transverse slot 38 and the rod 36 with an annular groove 39 aligned therewith (Figure 5), a U-shaped connecting or coupling member 40 being inserted in the dovetail slot 38 with its parallel legs passing through the annular groove 39.

The outer end of the motion-transmitting rod or shaft 36 is provided with an axially-directed projection 41 (Figures 6 and 7) of wedge-shaped cross-section and having opposite faces 42 and 43. The projection 41 extends into a transverse slot 44 in a movable measuring pin 45 which is reciprocable to and fro in a transverse bore 46 of the ball-shaped portion 47 of the measuring head 14. The axis of the bore 46 is perpendicular to the axis of the bore 37 in the stem 13, and the pin 45 is urged outwardly by a helical spring 48 mounted in the inner end of the bore 46 and having its opposite ends abutting the lower end 49 of the bore and the inner end 50 of the measuring pin 45 respectively. The slot 44 is of a width substantially equal to the thickness of the wedge-shaped projection 41 at its thicker end. This construction (as will be seen from Figures 6 and 7) enables the pin 45 to transmit motion to the motion-transmitting rod 36 substantially without backlash, since the contact edges at the thicker end of the projection 41 substantially simultaneously engage the opposite contact sides of the slot 44 and the wedge-shaped form of the projection 41 permits relative motion therebetween. Due to the substantial absence of backlash, an instant response of the motion-transmitting rod 36 is obtained upon motion of the measuring pin 45. The outer surface 51 of the ball-shaped portion 47 is of spherical shape and on the side thereof diametrically opposite the measuring pin 45 has a socket 52 therein coaxial with the bore 46 and receiving a wear-resisting button 53 of hard material such as tool steel, tungsten carbide or the like, and having an outer surface 54 which is of the same radius of curvature as the spherical surface 51 and forms a continuation thereof. The stem 13 is preferably made of a diameter only slightly less than the diameter of the head 14.

Similarly, the outer end of the movable measuring pin 45 is provided with a socket 55 in which is seated a second button 56 likewise of wear-resisting material similar to that of the button 53 and having an outer surface 57 of the same radius of curvature as the spherical surface 51. The ball portion 47 is preferably of a diameter only slightly less than the diameter of the bore which the gauge 10 is intended to measure, this difference in diameter preferably being of the order of a few thousandths of an inch. The spherical surfaces 54 and 57 of the two buttons 53 and 56 are thus disposed substantially in an equatorial zone of spherical curvature of constant radius transverse to the stem 13 and extending entirely around the head 14.

Slidably mounted on and along the tubular stem 13 is the standard checking ring 15. This is in the form of a cylindrical body of metal having a large bore 58 of the exact diameter which the gauge is intended to measure and a smaller coaxial bore 59 of slightly larger diameter than the stem 13 in order to permit the checking ring 15 to be rocked slightly relatively to the stem 13. The checking ring 15 is drilled as at 60 to receive a ball detent 61 which is pressed into frictional engagement with the stem 13 by a helical spring 62. A threaded plug 63 threaded into a counterbore 64 coaxial with the drilled hole or bore 60 serves as an abutment for the spring 62. The outer surface 65 of the checking ring 15 is preferably knurled or otherwise roughened so as to enable it to be grasped without slipping. The stem 13 is held in the bore 32 by a set screw 68 threaded into a threaded hole 69 and engaging a depression 70 in the stem 13 in order to properly locate these parts relatively to one another.

In the operation of the invention, let it be assumed that the head 14, as stated above, has been made only a few thousandths of an inch smaller in diameter than the diameter of the bore to be measured. In order to set the zero of his gauge, the operator grasps the handle 12 in one hand and the check ring 15 in the other hand, sliding the check ring 15 along the stem 13 until its standard diameter bore 58 passes over the measuring head 14, as shown by the dotted lines in Figure 1, forcing the measuring pin 45 inward to a position which would cause the dial indicator 11 to read zero. The looseness of fit of the bore 59 on the stem 13 provides a self-alignment of the checking ring 15 relatively to the measuring head 14. The inward motion of the measuring pin 45 causes the upper side wall 66 of the groove 44 to engage the edge of the upper face 42 of the wedge-shaped projection 41, rotating the motion-transmitting rod or shaft 36 around its axis and compressing the spring 48.

The rotation of the shaft 36 rotates its flattened portion 35 located within the bore or chamber 33 within the handle 12, converting its rotary motion to reciprocatory motion of the pin 22 by the engagement of the edge of the flattened portion 35 with the lower end 34 of the pin 22 (Figure 3). This motion is transmitted upward through the rod 23 and the dial indicator mechanism (not shown) to the needle shaft 26, rotating the latter and swinging the needle through an angle. If the tip of the needle 27 does not coincide with the zero marking or graduation upon the arcuate scale 29, the operator grasps the bezel 30 and rotates the dial 28 and scale 29 until this condition is fulfilled. The instrument is then ready for use and the operator accordingly slides the checking ring 15 away from its dotted line position over the measuring head 14 into its retracted position shown in Figure 1, where it is held in position by the frictional engagement of the ball detent 61 with the stem 13.

To measure a bore, the operator grasps the handle 12 in one hand and thrusts the measuring head 14 downward into the bore, which is assumed to be of a diameter within a few thousandths of an inch of the diameter of the ball portion 47, as previously stated. Since there are no fixed measuring pins or equalizing pins to be accurately located, the instrument does not need to be rocked and, since the stem 13 is only of slightly smaller diameter than the bore to be measured, it cannot be tilted through more than a slight angle before it encounters the edge of the bore being measured.

As the measuring head 14 enters the bore to be measured, the side wall of the bore forces the movable measuring pin 45 inward, this motion being transmitted to the dial indicator needle 27 and indicated on the scale 29 in the manner described above in connection with the use of the checking ring 15 for setting the zero of the instrument. If the tip of the needle 27 comes to rest upon the zero graduation of the scale 29, the hole or bore being measured is of exactly the intended diameter which, of course, rarely happens. Ordinarily, therefore, the tip of the needle 27 comes to rest on a graduation of the scale 29 which is to one side or the other of the zero graduation thereof, thus indicating a plus or minus value by which the bore being measured actually differs from the intended diameter of the bore.

Thus, the measuring operation merely requires the operator to thrust the measuring head 14 into each hole, record the indicated reading of the needle 27 upon the scale 29, and then withdraw the measuring head 14 and insert it in another bore. In this way, the bores can be measured more rapidly and with greater accuracy than with bore gauges hitherto employed. In order to insure that the instrument is reading accurately, the operator from time to time checks the zero setting by means of the checking ring 15 in the manner described above, so that the instrument is always maintained in a correctly set position. Since the checking ring 15 is permanently mounted upon the stem 13, it cannot get lost and misplaced, hence there is a greater likelihood of the instrument's being frequently checked than if a separate checking ring is employed for this purpose.

What I claim is:

1. In a dial indicator bore gauge, an elongated hollow support, a measuring head of generally spherical shape mounted on said support and having a radially-directed bore therein disposed transversely to the axis of said support, a movable measuring pin reciprocably mounted in said bore, and an elongated motion-transmitting element movably mounted in said support and having its opposite ends operatively connected in motion-transmitting relationship to said measuring pin and to said dial indicator respectively, the outer end surface of said movable measuring pin and the surface of said head in an equatorial zone transverse to said support extending entirely around said head and including said movable measuring pin having a spherical curvature of constant radius which is equal substantially to but slightly less than the radius of the bore intended to be measured by the gauge.

2. In a dial indicator bore gauge, an elongated hollow support, a measuring head of spherical shape mounted on said support and having a radially-directed bore therein disposed transversely to the axis of said support, said head having a substantially continuous spherical surface thereon with the different portions thereof disposed stationary relatively to one another, a movable measuring pin reciprocably mounted in said bore, and an elongated rotatable motion-transmitting element rotatably mounted in said support and having its opposite ends operatively connected in motion-transmitting relationship to said measuring pin and to said dial indicator respectively, the side of said head diametrically opposite said measuring pin being of spherical curvature of substantially the same radius and forming a continuation of the curvature of said head, said measuring pin having substantially flat spaced parallel contact surfaces thereon and one end of said motion-transmitting element having a projection of wedge-shaped cross-section with contact edges thereon engaging said flat contact surfaces.

3. In a dial indicator bore gauge, an elongated hollow support, a measuring head of spherical shape mounted on said support and having a radially-directed bore therein disposed transversely to the axis of said support, said head having a substantially continuous spherical surface thereon with the different portions thereof disposed stationary relatively to one another, a movable measuring pin reciprocably mounted in said bore, and an elongated rotatable motion-transmitting element rotatably mounted in said support and having its opposite ends operatively connected in motion-transmitting relationship to said measuring pin and to said dial indicator respectively, the side of said head diametrically opposite said measuring pin being of spherical curvature of substantially the same radius and forming a continuation of the curvature of said head, said measuring pin having therein a recess with substantially flat spaced parallel contact surfaces and one of said motion-transmitting element having a projection thereon having opposite substantially flat surfaces inclined at an acute angle to one another and forming a wedge of substantially the same base thickness as the width of said recess, the base of said wedge having contact edges engaging said flat contact surfaces of said recess.

4. In a dial indicator bore gauge of the type having an elongated hollow stem carrying a measuring head with a movable measuring pin therein operatively connected by motion-transmitting mechanism to said dial indicator, a gauge checking device comprising a body having a bore slidably receiving said stem and a counterbore, said body being movable along said stem into a position extending over said measuring head, said counterbore having a predetermined diameter corresponding to a selected reading of said dial indicator.

5. In a dial indicator bore gauge of the type having an elongated hollow stem carrying a measuring head with a movable measuring pin therein operatively connected by motion-transmitting mechanism to said dial indicator, a gauge checking device comprising a body having a bore slidably receiving said stem and a counterbore, said body being movable along said stem into a position extending over said measuring head, said counterbore having a predetermined diameter corresponding to a selected reading of said dial indicator, and a detent device disposed in said body and detainably engaging said stem.

6. In a dial indicator bore gauge, an elongated hollow support, a measuring head mounted on said support and having a bore therein disposed transversely to the axis of said support, a movable measuring pin reciprocably mounted in said bore, and an elongated rotatable motion-transmitting element rotatably mounted in said support and having its opposite ends operatively connected in motion-transmitting relationship to said measuring pin and to said dial indicator respectively, said measuring pin having substantially flat spaced parallel contact surfaces thereon and one end of said motion-transmitting element having a projection of wedge-shaped cross-section with contact edges thereon engaging said flat contact surfaces.

7. In a dial indicator bore gauge, an elongated hollow support, a measuring head mounted on said support and having a bore therein disposed transversely to the axis of said support, a movable measuring pin reciprocably mounted in said bore, and an elongated rotatable motion-transmitting element rotatably mounted in said support and having its opposite ends operatively connected in motion-transmitting relationship to said measuring pin and to said dial indicator respectively, said measuring pin having therein a recess with substantially flat spaced parallel contact surfaces and one end of said motion-transmitting element having a projection thereon having opposite substantially flat surfaces inclined at an angle to one another and forming a wedge of substantially the same base thickness as the width of said recess, the base of said wedge having contact edges engaging said flat contact surfaces of said recess.

References Cited in the file of this patent

UNITED STATES PATENTS

| Number | Name | Date |
|---|---|---|
| 1,157,389 | Hess | Oct. 19, 1915 |
| 1,385,405 | Tangen | July 26, 1921 |
| 1,656,180 | Eisele | Jan. 17, 1928 |
| 2,179,538 | Boehnke | Nov. 14, 1939 |
| 2,362,808 | Durgin | Nov. 14, 1944 |
| 2,376,118 | Brown | May 15, 1945 |
| 2,454,159 | Graves | Nov. 16, 1948 |
| 2,484,697 | Eisele | Oct. 11, 1949 |

FOREIGN PATENTS

| Number | Country | Date |
|---|---|---|
| 291,286 | Great Britain | May 31, 1928 |